Patented Dec. 26, 1950

2,535,931

UNITED STATES PATENT OFFICE 2,535,931

METHOD OF RECLAIMING ELASTOMERS

John H. Kelly, Jr., Wabash, Ind., assignor to The General Tire and Rubber Company, Akron, Ohio, a corporation of Ohio No Drawing. Application September 18, 1947, Serial No. 774,883

15 Claims. (Cl. 260—2.3)

This invention relates to the reclaiming of vulcanized rubbers and rubberlike compounds. It particularly relates to the reclaiming of vulcanized polymers and copolymers of monomers having a conjugated diene present in substantial proportion.

The reclaiming of polymers of a conjugated diene such as chloroprene, butadiene-1,3, isoprene, etc. and copolymers of such conjugated dienes with styrene, acrylonitrile or other aliphatic unsaturated materials which contain a single olefin group has heretofore caused considerable difficulty. This is especially the case when the scrap material to be reclaimed is not of a single type but, for example, consists of a mixture of one or more rubbery materials such as natural rubber, GR–S, neoprene, etc.

The so-called alkali process of reclaiming widely used before the advent of synthetic rubbers has been found to be unsuitable for reclaiming synthetic rubbers such as chloroprene or butadiene polymers or copolymers. Reclaimers have, in fact, been forced to outrightly discard mixtures of otherwise suitable vulcanized Hevea rubber scrap when it was contaminated with varying amounts of such scrap vulcanized synthetic rubbers. To plasticize scrap synthetic rubber or such mixtures it has been proposed to use certain catalytic agents at extremely elevated temperatures, with or without air under pressure in the reclaiming mixture. Such processes before proposed, have not as far as I am aware been successful. Also, straight digester processes at temperatures ranging from 435° F. to 485° F. have been proposed, but such high temperatures often embrittled synthetic rubber scraps. To alleviate this condition, appreciable quantities of swelling agents, such as 10–50% of crude coal tar solvent naphtha, carrying appreciable amounts of dissolved softeners such as pine tar, coumar, asphaltic fluxes, etc. have been proposed. The large amounts of such swelling agents and plasticizers required have been deterrents to the commercial success of the process.

Attempts to plasticize synthetic rubber scrap with phenyl hydrazine or its complexes, with or without the presence of large amounts of solvent naphtha, with or without heated air under pressure, with kneading at long intervals at elevated temperatures, while ingenious, have been restricted by cost and other limitations.

It has also been proposed to reclaim Hevea rubber by masticating this material in the presence of water-soluble alkyl amines, alkoxy polyamines and alkyl aminothiols at temperatures of about 400° F. This process has been seriously limited by inability to plasticize synthetic rubber scraps within operating temperatures of about fifteen or sixteen minutes at temperatures as low as 400° F. It has also been seriously limited by the toxic volatilization accompanying the use of these reagents.

Another method heretofore proposed for the reclaiming of natural rubber or GR–S has been to incorporate the ground vulcanized scrap in a Banbury mixer and to masticate it with very high rotor speeds and ram pressures to obtain a temperature throughout the mass of 400° F. to 550° F. The maintenance of the scrap at such a temperature for a substantial period of time under mastication has a plasticizing action on the scrap, which enables it to be utilized for some purposes after a suitable refining treatment. The high operating temperatures are costly, both from the standpoint of power input and from the question of bearing life and fatigue resistance of the Banbury mixer itself. Furthermore, the temperatures above 400° F. are not conductive to the most desirable properties in the reclaim rubber produced.

It is an object of the present invention to provide a method of reclaiming rubber or synthetic rubbers which is effective in a Banbury mixer at temperatures less than 400° F.

It is another object of the present invention to provide a method of reclaiming rubber wherein the reclaiming is accomplished at time intervals materially shorter than those heretofore used and at temperatures below those of processes before proposed.

It is a still further object of the present invention to provide a method of reclaiming natural or synthetic rubbers which results in a reclaim having processing qualities nearly equivalent to the unvulcanized parent compound.

Because of the difficulty in recognizing the various types of rubber scrap, it is exceedingly difficult to prevent mixtures of oil-resistant and non-oil-resistant scrap from occurring. In accordance with the processes heretofore proposed in the prior art, the reclaiming of mixtures of rubbery polymers and copolymers, such as mixtures of neoprene and Buna-S, were not, as far as I am aware, successful. It is another and important object of the present invention to provide a method of satisfactorily reclaiming mixtures of various vulcanized rubbery materials, such as neoprene, GR–S, natural rubber and the like.

The above and other objects, which will be apparent from the following description of the invention, are accomplished in accordance with the present invention by subjecting the vulcanized rubbery material or materials to an elevated temperature and preferably to friction and mechanical pressure in the presence of an aliphatic phosphoric acid compound, preferably an alkyl phosphate having three or more carbon atoms in a hydrocarbon group.

The heating preferably occurs with simultaneous mastication or is a result of mastication, and a temperature of at least 200° F. is required, although reclaiming is accelerated when the temperature is 250° F. or 300° F., or even up to 400° F. My reclaiming process is most advantageously accomplished with mastication in a mixer such as a Banbury mixer, the power input to which is one means of providing the substantial proportion of the desired heat. Commercial operating temperatures are preferably between 315° F. or 320° F. to 390° F.

The aliphatic phosphoric acid compounds, such as the alkyl phosphoric acid compounds which serve as a main depolymerization or reclaiming catalyst in the plasticizing process of the present invention, are preferably selected from the neutral alkyl phosphates, the alkyl phosphoric acids, and alkyl phosphoric acid salts. In addition to one or more of these materials, a small amount, preferably .25 to 5% of a non-oxidizing inorganic acid, preferably ortho-phosphoric acid, exerts a pronounced influence on the reaction of the salts, etc. and is desirable.

The neutral alkyl phosphates include the orthophosphates having the general formula $R_3PO_4$, the pyrophosphates having the general formula $R_4P_2O_7$, the tripolyphosphates having the general formula $R_5P_3O_7$, the tetrapolyphosphates having the general formula $R_6P_4O_{10}$, and the metaphosphates having the general formula $RPO_3$. In all cases "R" is an alkyl group.

The alkyl phosphoric acids include the orthophosphates having the general formulae $R_2HPO_4$ and $RH_2PO_4$, the pyrophosphates having the general formula $R_2H_2P_2O_7$, the tripolyphosphates $R_5H_5P_6O_{20}$, and the tetrapolyphosphates having the general formula $R_3H_3P_4O_{13}$. As in the case of the neutral alkyl phosphates, "R" is an alkyl group, preferably having three or more carbon atoms.

The alkyl phosphoric acid salts include the orthophosphates having the general formula $R_2MPO_4$, the mono-orthophosphates having the general formula $RM_2PO_4$, the pyrophosphates having the general formula $R_2M_2P_2O_7$, the tripolyphosphates having the general formula $R_5M_5P_6O_{20}$, and the tetrapolyphosphates having the general formula $R_3M_3P_4O_{13}$, where "R" is an alkyl group, and "M" is selected from salt-forming metals including alkali metals and organic bases such as amine and ammonium compounds. "M" is preferably an amine or ammonium compound.

In the aliphatic phosphates utilized in accordance with the present invention, the hydrocarbon group, such as an alkyl or allylene group, exerts a solubilizing influence and apparently acts to facilitate transportation of the active phosphoric radicals throughout the rubbery mass so that they are in more effective position to depolymerize or destroy the connecting bonds between molecules thereof. For this reason alkyl groups are preferred that have more than three carbon atoms. In general the longer alkyl group, the greater is the compatibility of solubilization of the phosphate compound within the rubbery mass.

Examples of the aliphatic phosphoric acid compounds which may be utilized in accordance with the present invention are: N-butyl phosphoric acid; amyl phosphoric acid; hexabutyl-tetraphosphate; tetrabutyl-pyrophosphate; pentabutyl-tripolyphosphate; di-octyl acid orthophosphate; trioctyl acid tetraphosphate; monocapryl acid orthophosphate; pentaoctyl acid tripolyphosphate; monoamyl - triethanolamine - orthophosphate; dicapryl-triethanolamine-pyrophosphate; penta-amyl ammonium tripolyphosphate; triamyl ammonium tetraphosphate; etc. Other modifications with the longer alkyl substituents are obviously within the scope of this invention.

In carrying out my process, the ground scrap rubber of a rubbery polymer or mixtures thereof is preferably incorporated into a suitable mixer. The mixer has means for maintaining a mechanically applied pressure, generally 20 to 50 p. s.i. on the scrap, and is equipped with a heated jacket. A small amount of one or more of the aforementioned phosphoric acid compounds and one or more cooperating catalysts, preferably added as hereinafter described, are incorporated with the scrap in the mixer. A suitable reclaim is produced at a maximum temperature that is usually substantially less than 400° F. in a relatively short time.

In general, it is preferred to add to the mixer a portion (about one-half) of the scrap, all of the catalyst and any softener desired and to run the mixer a short time before the remaining one-half of the scrap is added, and then to continue the mixing until desired plasticization has occurred, or preferably until a temperature in the general neighborhood of about 325° F. to 370° F. has been maintained for at least five minutes or so.

The vulcanized rubber scrap may be a sulfur-vulcanized synthetic rubber, a compounded Hevea rubber, chloroprene or the like. The process is effective in reclaiming the vulcanized rubberlike polymers of one or more elastogenic materials, including the polymers of butadiene compounds (including butadiene-1,3, isoprene, dimethyl butadiene, chloroprene, etc.) or copolymers of one or more such compounds with any copolymerizable monovinyl compound, such as methyl methacrylate, acrylonitrile, arylvinyl compounds, for example, styrene, nuclear-substituted styrenes including 2,5- and 2,4- and 2,3-dichlorostyrene, the alphamethyl styrenes including 3,4 and 3,5 dichloro alphamethyl styrene, etc. "Elastogenic" is used herein as in Patent No. 2,384,277 to mean capable of forming reclaimable rubberlike materials. Mixtures of such scrap may also be used.

In addition to the aliphatic phosphoric acid compounds which serve as a main catalyst of the present invention and which are generally used in amounts of about .25% to .5% by weight of the rubbery material being plasticized (more may be used), a small amount of water and non-oxidizing acid, such as orthophophosphoric acid, and one or more rubber softeners are preferably incorporated into the reclaiming mix and distributed through the rubbery polymer before or during the heating and/or masticating operation. A small amount of water or the nonoxidizing inorganic acid, orthophosphoric acid, greatly reduces the time required for the alkyl phosphoric acid compound to accomplish the rupture of cross-linkages, as indicated by the increased plasticization of the rubbery mass. The rubber softeners, which are usually oleaginous materials such as pine tar, mineral oil, coal tar distillate, liquid polymer of a butadiene and rubber compatible high boiling esters, also function as plasticizing agents and materially improve the quality of the reclaim produced. This is particularly true in the case of oxidized rosin which markedly improves both the product and processing characteristics. The rubber softener is generally present in amounts of at least 5% of the weight of the rubberlike material, and about 5% to 10% or 15% is usually preferred. When the amount of softener exceeds 25% or 30% of the weight of the rubber-like material properties of the reclaim are usually deteriorated. The water and phosphoric acid, if present, may be used in varying amounts, although about 2% to about 5% of water and about 1% to 5% of the phosphoric acid based on the weight of the scrap rubber-like polymer are generally preferred.

Several separated batches of ground tire tread stock were incorporated in a Laboratory Model B Banbury Mixer. Each batch contained the amounts of oxidized rosin, pine tar, ortho-phosphoric acid, water and alkyl-phosphoric acid compound indicated in the table below:

*Table*

| Batches Nos. | 1 | 2 | 3 | 4 | 5 | 6 | 7 | 8 |
|---|---|---|---|---|---|---|---|---|
| Ground GRS Peels (tread stock) | 1,700 | 1,700 | 1,700 | 1,700 | 1,700 | 1,700 | 1,700 | 1,700 |
| Oxidized Rosin | 82 | 82 | 82 | 82 | 82 | 82 | 82 | 82 |
| Pine Tar | 36 | 36 | 36 | 36 | 36 | 36 | 36 | 36 |
| Penta-amyl ammonium tripolyphosphate | 30 | | | | | | | |
| Hexabutyl-tetrapolyphosphate | | 30 | | | | | | |
| Monocapryl acid orthophosphate | | | 30 | | | | | |
| Dioctyl acid orthophosphate | | | | 30 | | | | |
| Monoamyl triethanolamine phosphate | | | | | 30 | | | |
| N-propyl phosphoric acid | | | | | | 28 | | |
| Amyl phosphoric acid | | | | | | | 28 | |
| N-butyl phosphoric acid | | | | | | | | 28 |
| 85% orthophosphoric acid | 14 | 14 | 14 | 14 | 14 | 14 | 14 | 14 |
| Water | 50 | 50 | 50 | 50 | 50 | 50 | 50 | 50 |

In each case half of the ground tire tread scrap was first added to the mixer and while the mixer was in operation the oxidized rosin, pine tar and alkyl-phosphoric acid were incorporated, then the remaining portion of the scrap, and finally the aqueous solution of orthophosphoric acid was added. A ram pressure of 26 p. s. i. was used on the Banbury mixer and the operating temperatures averaged 345° F. to 370° F. The speed was equivalent to 40 R. P. M. or 110 surface feet per minute on a No. 11 Banbury. A total time of sixteen minutes elapsed after the first addition until plasticization was completed.

In all instances, the product produced readily sheeted out on the mill and was refined without difficulty. When compounded with the usual compounding agents, a reclaim stock was obtained that may be cured to produce articles having very desirable properties.

The ground GR–S tread stock may be substituted by natural rubber, mixtures of natural rubber with GR–S, mixtures of one or more synthetic rubbers including neoprene with GR–S, and/or natural rubber, or by other vulcanized scrap of the rubbery polymers or copolymers aforementioned.

The rubber softeners in the above example may be substituted in whole or in part by other rubber softeners, or even eliminated, although they add to the quality of the reclaim. Oxidized rosin in combination with the alkyl-phosphates, is as aforementioned especially desirable. The rubber softeners are not essential to the operation and if necessary can be left out; however, this increases the plasticizing time required. The orthophosphoric acid may also be eliminated, although a somewhat longer time is required to accomplish the reclaiming operation than when it is present.

It will be seen from the above examples that the reclaiming operation is accomplished in a relatively short time, even when only 1% to 2% (based on the weight of the rubbery polymer) of the main catalyst is present. More may be used, and with up to 5% or so the operation is facilitated. Much more than 8% or 10% is not economical however. As little as .25% of the alkyl phosphoric acid compounds is noticeably effective in the plasticizing operation.

In view of the fact that these materials like others used are readily available at relatively low cost, and in view of the fact that mixed scrap containing a number of synthetic polymers may be used, it is seen that the process has many commercial advantages aside from the fact that a very high quality reclaim stock is produced.

It is to be understood that variations and modifications of the invention herein shown and described may be made without departing from the spirit of the invention.

What I claim is:

1. A method of reclaiming a vulcanized rubbery mass comprising at least one polymerization product of a material having a conjugated diolefinic compound as a main polymerizable component, which method comprises heating said rubbery mass at elevated temperature, above 200° F. but not appreciably above 400° F., in the presence of a relatively small amount of a compound having at least three carbon atoms in an alkyl group thereof, selected from the group consisting of alkyl phosphates, alkyl phosphoric acids and alkyl phosphoric acid salts, said group members being further characterized in that all hydrocarbon groups are mono-valent, said compound being distributed through said rubbery mass during at least part of said heating, whereby plasticization of said rubbery mass occurs.

2. A method of reclaiming a vulcanized rubbery mass comprising at least one polymerization product of a material having butadiene-1,3 as a main polymerizable component, which method comprises masticating said rubbery mass in a subdivided state at elevated temperatures, above 250° F. but not appreciably above 400° F., in the presence of a member of the group consisting of alkyl phosphates, alkyl phosphoric acids and alkyl phosphoric acid salts, said group members having at least three carbon atoms in an alkyl group thereof, and being further characterized in that all hydrocarbon groups thereof are mono-valent, said mastication being continued until plasticization of said rubbery mass occurs.

3. The method of claim 2 wherein water is also present during at least part of said mastication.

4. The method of claim 1 wherein water is present during a substantial portion of said heating treatment.

5. The method of claim 2 wherein orthophosphoric acid is also present during at least part of said mastication treatment and wherein the temperature during at least part of said mastication treatment is above 300° F.

6. A method of reclaiming a vulcanized rubbery mass comprising at least one polymerization product of a material having butadiene-1,3 as a main polymerizable component, which method comprises masticating said rubbery mass in a subdivided state at elevated temperatures, below 400° F., in the presence of a neutral alkyl phosphate having at least three carbon atoms, said mastication being continued until plasticization of said rubbery mass occurs.

7. A method of reclaiming a vulcanized rubbery mass comprising at least one polymerization product of a material having butadiene-1,3 as a main polymerizable component, which method comprises masticating said rubbery mass in a subdivided state at elevated temperatures, between 200° F. to 400° F., in the presence of an alkyl phosphoric acid having at least three carbon atoms, said mastication being continued until plasticization of said rubbery mass occurs.

8. A method of reclaiming a vulcanized rubbery mass comprising at least one polymerization product of a material having a conjugated butadiene as a main polymerizable component, which method comprises masticating said rubbery mass in a subdivided state at elevated temperatures, between 200° to 400° F., in the presence of an alkyl phosphoric acid salt having at least three carbon atoms, said mastication being continued until plasticization of said rubbery mass occurs.

9. The method of claim 2 wherein the total amount of said group members present is .25% to 5% by weight of the cured rubbery mass.

10. The method of claim 2 wherein the total of said group members present is .25% to 5% by weight of the cured rubbery mass and wherein a rubber softener is also present during mastication.

11. The method of claim 2 wherein a rubbery softener and orthophosphoric acid are present during the mastication treatment and wherein the total amount of said group members is between .25% and 5% by weight of said rubbery mass.

12. The method of claim 2 wherein the phosphoric acid compound is a phosphate of an aliphatic alcohol having the general formula $C_nH_{(2n+1)}OH$.

13. The method of claim 2 wherein the phosphoric acid compound is a propyl alcohol phosphate.

14. A method of reclaiming a vulcanized rubbery mass comprising at least one polymerization product of a material having a conjugated butadiene as a main polymerizable component, which method comprises heating said rubber mass at elevated temperature of about 300° F. to 400° F. in the presence of a relatively small amount of a member of the group consisting of alkyl phosphates, alkyl phosphoric acids, and alkyl phosphoric acid salts, each of said group members having at least three carbon atoms in an alkyl group thereof, and being further characterized in that all hydrocarbon groups therein are mono-valent, and being distributed through said rubbery mass during at least part of said heating, whereby plasticization of said rubbery mass occurs.

15. The method of claim 14 wherein a small amount of orthophosphoric acid is also present during the heating step.

JOHN H. KELLY, Jr.

REFERENCES CITED

The following references are of record in the file of this patent:

UNITED STATES PATENTS

| Number | Name | Date |
| --- | --- | --- |
| 2,313,693 | Winkelmann | Mar. 9, 1943 |
| 2,325,979 | Sarbach | Aug. 3, 1943 |
| 2,378,717 | Macey | June 19, 1945 |